United States Patent [19]
Muramoto

[11] Patent Number: 5,523,785
[45] Date of Patent: Jun. 4, 1996

[54] IMAGE PICKUP APPARATUS FOR A VIDEO CAMERA

[75] Inventor: Tomotaka Muramoto, Tokyo, Japan

[73] Assignee: Canon Kabushiki Kaisha, Tokyo, Japan

[21] Appl. No.: 172,428

[22] Filed: Dec. 22, 1993

[30] Foreign Application Priority Data

Dec. 28, 1992 [JP] Japan ................................. 4-360143

[51] Int. Cl.⁶ ..................................................... H04N 5/202
[52] U.S. Cl. ........................................... 348/254; 348/675
[58] Field of Search ................................. 348/235, 236, 348/254, 674, 675, 255; H04N 5/202, 9/69

[56] References Cited

U.S. PATENT DOCUMENTS

| | | | |
|---|---|---|---|
| 3,729,580 | 4/1973 | Schneider | 178/5.4 R |
| 4,415,923 | 11/1983 | Noda | 358/41 |
| 4,697,208 | 9/1987 | Eino | 358/44 |
| 4,876,591 | 10/1989 | Muramatsu | 358/43 |
| 4,884,128 | 11/1989 | Hieda | 358/29 |
| 5,184,212 | 2/1993 | Yamamoto | 358/39 |
| 5,194,943 | 3/1993 | Tomita | 358/32 |
| 5,267,028 | 11/1993 | Suga | 358/44 |
| 5,283,634 | 2/1994 | Yamazaki | 358/234 |
| 5,345,265 | 9/1994 | Kim | 348/254 |

FOREIGN PATENT DOCUMENTS

| | | | |
|---|---|---|---|
| 54-116127 | 9/1979 | Japan | H04N 9/04 |
| 56-010789 | 2/1981 | Japan | H04N 9/04 |
| 03050984 | 3/1991 | Japan | H04N 9/67 |
| 03173287 | 7/1991 | Japan | H04N 9/04 |
| 04110992 | 4/1992 | Japan | H04N 9/64 |
| 02200012 | 7/1988 | United Kingdom | H04N 5/14 |
| 02250886 | 6/1992 | United Kingdom | H04N 5/20 |

OTHER PUBLICATIONS

European Patent Office: Patent Abstracts of Japan, vol. 3, No. 136 (E–151), Nov. 13, 1979.
European Patent Office: Patent Abstracts of Japan, vol. 15, No. 417 (E–1125), Oct. 23, 1991.
European Patent Office: Patent Abstracts of Japan, vol. 5, No. 59 (E–53), Apr. 22, 1981.
European Patent Office: Patent Abstracts of Japan, vol. 15, No. 195 (E–1069), May 20, 1991.

*Primary Examiner*—Wendy R. Greening
*Attorney, Agent, or Firm*—Morgan & Finnegan

[57] ABSTRACT

An image pickup apparatus comprises an image pickup section for converting an image of an object formed through a lens into an electric signal, a high frequency and low frequency separating circuit for separating the electric signal generated from the image pickup section into a high frequency component and a low frequency component, a gamma converting circuit for gamma correcting the electric signal of the low frequency component separated by the high frequency and low frequency separating circuit and a matrix circuit for adding the electric signal of the high frequency component separated by the low frequency and high frequency separating circuit and the electric signal of the low frequency component which was gamma corrected by the gamma converting circuit, thereby outputting a luminance signal and color difference signals.

10 Claims, 9 Drawing Sheets

IMAGE PICKUP APPARATUS FOR A VIDEO CAMERA

BACKGROUND OF THE INVENTION

1. Field of the Invention

The invention relates to an image pickup apparatus and, more particularly, to an image pickup apparatus which is advantageously applied to a video camera using an image pickup device such as CCD or the like.

2. Related Background Art

FIG. 4 shows a functional block diagram of a conventional image pickup apparatus. In FIG. 4, an image formed on a CCD 2 by a lens 1 is converted into electric signals of R (red), G (green), and B (blue). After that, the electric signals pass through a sample and hold (S/H) and automatic gain control (AGC) circuit 5 and gains of the respective colors of R, G, and B are adjusted by a white balance (WB) adjusting circuit 6. Gamma characteristics of those signals are corrected by a gamma converting circuit 8. The gamma correction in this instance is generally set to $\gamma =$ about 0.45. The gamma corrected RGB signals are converted into the luminance signal and color difference signals by a matrix circuit 9 and, after that, a composite video signal is output from an encoder 13.

On the other hand, an image pickup apparatus for extracting the luminance signal and chrominance signals from different image pickup devices and synthesizing them and obtaining a video signal is known as a double-plate type image pickup apparatus.

FIG. 7 is a block diagram showing a construction of a conventional double-plate type image pickup apparatus. In FIG. 7, reference numeral 114 denotes a CCD for the chrominance signals; 115 a CCD for the luminance signal; and 116 a half mirror to divide the light to the CCD for the chrominance signals and the CCD for the luminance signal. The CCDs 115 and 114 are driven by a CCD driver 104 which is made operative by a clock signal from a clock generator 103. The light which passed through an image pickup lens 101 is separated by the half mirror 116 to the signal which goes to the CCD 114 for the chrominance signals and the signal which goes to the CCD 115 for the luminance signal and is formed as images on the CCD, respectively. The signals of R, G, and B are output from the CCD 114 and pass through an S/H and AGC circuit 105. After that, levels of those signals are adjusted by a WB adjusting circuit 106. The RGB signals supplied from the WB adjusting circuit 106 are gamma corrected by a gamma converting circuit 108 and, after that, they are supplied to a matrix circuit 109. The matrix circuit 109 forms color difference signals from the input RGB signals. The color difference signals are band limited by low pass filters 110 and 111 and are supplied to an encoder 113. An output from the CCD 115 for the luminance signal passes through the S/H and AGC circuit 105 and is subsequently gamma corrected by the gamma converting circuit 108. After that the signal is band limited by a low pass filter 112 and is input to the encoder 113. The encoder 113 converts the chrominance signals and luminance signal which were input into the composite video signal and outputs.

The white balance adjusting circuit 106 in the image pickup apparatus using color filters of the pure color type uses a system such that the R, G, and B signals are extracted and the amplitude of the G signal is set to a reference and amplification gains of the R and B signals are controlled. In case of applying such a system to the double-plate type camera, as a first method, there is a method whereby the processes are separated to the CCD 115 for the luminance signal and the CCD 114 for the chrominance signals and the color filters of RGB are attached to the CCD 114 for the chrominance signals and the white balance is obtained by only the output of the CCD 114 for the chrominance signals. As a second method, there is a method whereby the processes are separated to the CCD for the G signal and the CCD for the R and B signals and the white balance is obtained by the outputs of both of the CCDs.

In the above conventional apparatus, since the gamma correction is also executed to noises which are generated on the sensor and on its output stage, there is a problem such that the noises in the portion in which the signal level is relatively low are emphasized and an S/N ratio is deteriorated.

In the above conventional example, since the incident light is divided to the CCD for the chrominance signals and the CCD for the luminance signal, the incident light amount to each CCD decreases, so that there is a problem such that the S/N ratio of the luminance signal is deteriorated.

With respect to the white balance as well, in case of the first method, there is a problem such that since the signal of each of R, G, and B is extracted from the CCD for the chrominance signals, a sampling frequency with respect to one color is low, so that a color moire is likely to occur. It is, therefore, necessary to sufficiently drop the band by an optical low pass filter.

In case of the second method, although it is advantageous for the color moire, since the signals of two CCDs are used to form the luminance signal, there is a problem such that a positioning precision of the CCDs is severe.

SUMMARY OF THE INVENTION

It is an object of the invention to solve the drawbacks of such a conventional technique and to provide an image pickup apparatus which can remarkably improve an S/N ratio of a dark portion of an output image by properly performing the gamma correction.

Another object of the invention is to provide an image pickup apparatus which doesn't deteriorate the S/N ratio of a luminance signal.

Still another object of the invention is to provide an image pickup apparatus which can relatively reduce a relative positioning precision between two video devices of the double-plate type.

To solve the above problems, according to an embodiment of the invention, there is provided an image pickup apparatus comprising: image pickup means for converting an image of an object formed through a lens into an electric signal; high frequency and low frequency separating means for separating the electric signal supplied from the image pickup means into a high frequency component and a low frequency component; gamma converting means for gamma correcting the electric signal of the low frequency component separated by the high frequency and low frequency separating means; and matrix means for adding the electric signal of the high frequency component separated by the high frequency and low frequency separating means and the electric signal of the low frequency component which was gamma corrected by the gamma converting means, thereby outputting a luminance signal and color difference signals.

According to another embodiment of the invention, there is provided an image pickup apparatus comprising: first image pickup means for outputting chrominance signals of an image of an object formed through a lens; second image pickup means for outputting a luminance signal of the image of the object formed through the lens; separating means for receiving the luminance signal from the second image pickup means and separating into the luminance signal of a high frequency component and the luminance signal of a low frequency component; gamma converting means for respectively receiving the chrominance signals from the first image pickup means and the luminance signal of the low frequency component from the separating means and for gamma correcting those signals; amplitude control means for receiving the luminance signal of the high frequency component from the separating means and performing an amplitude control of such a luminance signal; adding means for adding the luminance signal which was gamma corrected by the gamma converting means and the luminance signal which was amplitude controlled by the amplitude control means, thereby outputting a luminance signal; and matrix means for receiving the chrominance signals which were gamma corrected by the gamma converting means, thereby outputting color difference signals.

According to still another embodiment of the invention, there are provided two gamma converting circuits such as to execute the ordinary gamma correction to the output of the image pickup device for the luminance signal and to execute the gamma correction having characteristics different from those of the ordinary gamma correction to the output of the image pickup device for the chrominance signals.

According to further another embodiment of the invention, the image pickup device for the luminance signal is constructed so as to receive a white signal without attaching any color filter and the image pickup device for the chrominance signals is constructed so as to receive the R and B signals by attaching color filters of R and B.

According to the above embodiments, when the image of the object is formed on the image pickup means through the lens, the image is converted into the electric signal by the image pickup means and is sent to the high frequency and low frequency separating means and is separated to the electric signal of the high frequency component and the electric signal of the low frequency component. The electric signal of the low frequency component is sent to the gamma converting means and is gamma corrected. The gamma corrected electric signal is sent to the matrix means together with the electric signal of the high frequency component and is converted into the luminance signal and the chrominance signals.

According to the embodiment, the chrominance signals of the image of the object are output by the first image pickup means and the luminance signal of the same image is output by the second image pickup means, respectively. The luminance signal is sent to the separating means and is separated into the luminance signal of the low frequency component and the luminance signal of the high frequency component. The luminance signal of the low frequency component is gamma corrected. The luminance signal of the high frequency component is amplitude controlled. The gamma corrected luminance signal of the low frequency component and the amplitude controlled luminance signal of the high frequency component are added by the adding means, from which a luminance signal is output.

According to another embodiment, two kinds of gamma converting circuits are provided and the gentle gamma characteristics are set for the chrominance signals. Thus, noises of the chrominance signals which are generated in the dark portion of the picture plane are apparently reduced.

According to still another embodiment, by setting the sampling frequency of the chrominance signals to a high value, the color moire is reduced and the S/N ratio of the luminance signal is improved.

The above and other objects and features of the present invention will become apparent from the following detailed description and the appended claims with reference to the accompanying drawings.

DETAILED DESCRIPTION OF THE PREFERRED EMBODIMENTS

An embodiment of an image pickup apparatus according to the present invention will be described in detail hereinbelow with reference to the drawings.

Figure 1:
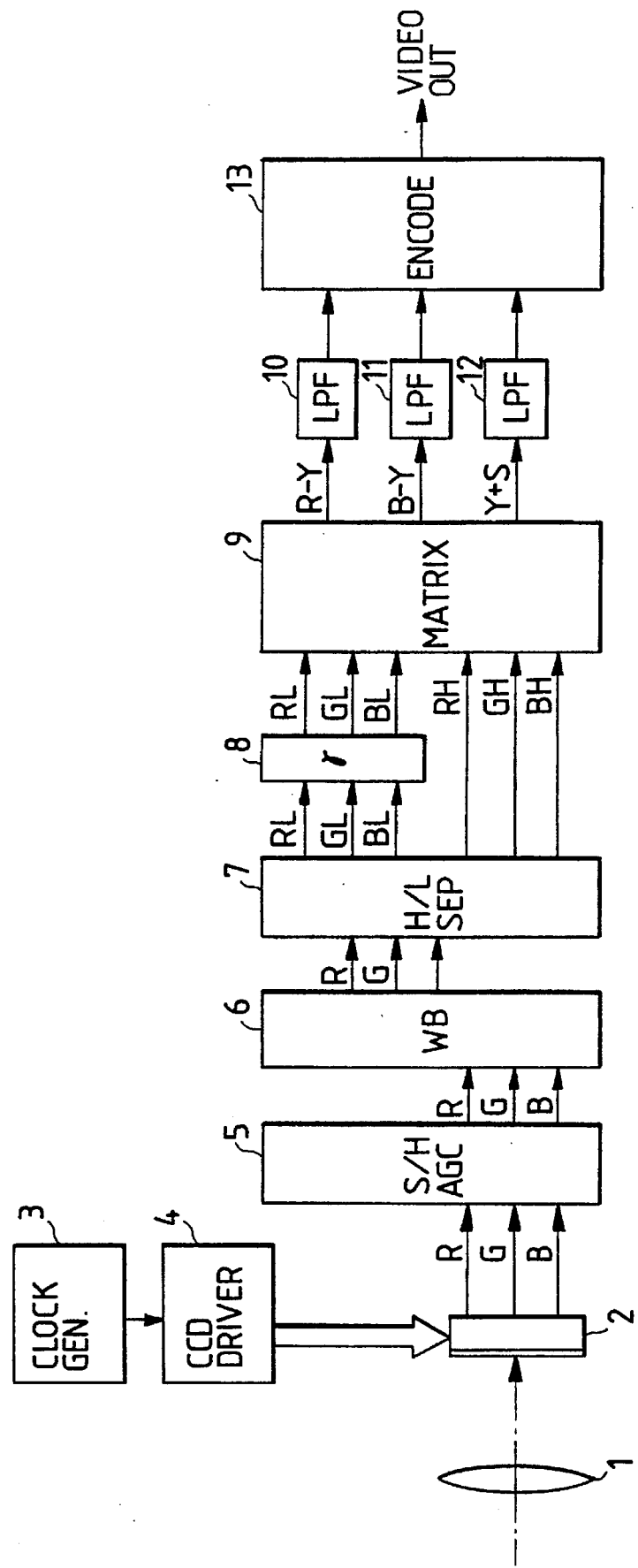
FIG. 1 is a functional block diagram showing an embodiment of an image pickup apparatus according to the invention.

FIG. 1 is a functional block diagram showing an embodiment of the image pickup apparatus according to the invention. In FIG. 1, the image pickup lens 1 is used to form an image of an object (not shown) to be photographed. The video image of the object formed through the lens is sent to the image pickup device 2.

The image pickup device 2 is a solid state image pickup device such as a CCD or the like and is driven by a CCD driver 4 which receives clocks from a clock generator 3. The image pickup device 2 is connected to the sample and hold (S/H) and automatic gain control (AGC) circuit 5. The image pickup device 2 is driven by the CCD driver 4 and electric signals of R, G, and B of the object whose image was formed on the image pickup device 2 are output to the S/H AGC circuit 5.

The S/H AGC circuit 5 samples and holds the input R, G, and B signals and performs the AGC (automatic gain control) to those signals and is connected to a white balance (WB) adjusting circuit 6. The WB adjusting circuit 6 adjusts the white balance of the R, G, and B signals supplied from the S/H AGC circuit 5 and is connected to a high frequency and low frequency separating circuit 7.

The high frequency and low frequency separating circuit 7 separates each of the R, G, and B signals whose white balance was adjusted into the high frequency component and the low frequency component and is connected to the gamma converting circuit 8 and the matrix circuit 9. The separating circuit 7 sends RL, GL, and BL signals as R, G, and B signals of the low frequency component to the gamma converting circuit 8 and transmits RH, GH, and BH signals of the R, G, and B signals of the high frequency component to the matrix circuit 9.

The gamma converting circuit 8 executes a gamma correction to the RL, GL, and BL signals of the low frequency component. The gamma converting circuit 8 is connected to the matrix circuit 9 and supplies the gamma corrected RL, GL, and BL signals to the matrix circuit 9.

The matrix circuit 9 receives the R, G, and B signals of the high frequency component and the gamma corrected RL, GL, and BL signals of the low frequency component and adds them, thereby converting into a luminance signal (Y+S) and color difference signals (R–Y) and (B–Y). The matrix circuit 9 is connected to low pass filters (LPFs) 10, 11, and 12 and sends the color difference signal (R–Y) to the LPF 10, the color difference signal (B–Y) to the LPF 11, and the luminance signal (Y+S) to the LPF 12, respectively.

Each of the low pass filters 10 to 12 cuts a predetermined frequency component of the input signal, thereby limiting a band. The LPFs 10 to 12 are connected to the encoder 13. The encoder 13 converts the luminance signal (Y+S) and color difference signals (R–Y) and (B–Y) supplied from the LPFs into a composite video signal and outputs.

The operation of the embodiment shown in FIG. 1 will now be described.

The image formed on the image pickup device 2 through the image pickup lens 1 is converted into the electric signal. After that, the electric signal passes through the S/H AGC circuit 5 and is subjected to a gain adjustment of each color of R, G, and B by the white balance adjusting circuit 6. The white balance adjusted RGB signals are respectively separated into the high frequency component and the low frequency component by the high frequency and low frequency separating circuit 7. The low frequency component is gamma corrected by the gamma converting circuit 8 in a manner similar to the ordinary signal process and, after that, it is supplied to the matrix circuit 9.

The high frequency component is directly sent to the matrix circuit 9 without executing the conversion of the gamma characteristics. The matrix circuit 9 adds the high and low frequency components of the RGB signals and, after that, converts into the luminance signal and the color difference signals. Outputs of the matrix circuit 9 are band limited by the low pass filters 10, 11, and 12, respectively. After that, they are converted into the composite video signal by the encoder 13 and output therefrom.

Another embodiment of an image pickup apparatus according to the invention will now be described with reference to FIG. 2.

The embodiment relates to the case of applying the present invention to a CCD camera of the double-plate type. In the embodiment, the image pickup device is constructed by a CCD 14 for chrominance signals and a CCD 15 for a luminance signal. The light from the image pickup lens 1 is separated to the CCDs 14 and 15 by a half mirror 16 and images are formed on the CCDs.

Since the two image pickup devices for the luminance signal and for the chrominance signals are used in the embodiment as mentioned above, the luminance signal from the CCD 15 for the luminance signal is separated into a luminance signal YH of the high frequency and a luminance signal YL of the low frequency by a high frequency and low frequency separating circuit 23. The low frequency luminance signal YL is gamma corrected. The high frequency luminance signal YH is amplitude controlled by an amplitude control circuit 18. The resultant luminance signals are added by an adder 17, thereby obtaining the luminance signal (Y+S). In the embodiment, the component elements having substantially the same functions as those in the component elements shown in FIG. 1 are designated by the same reference numerals.

The operation of the embodiment will now be described in detail with reference to FIG. 2. The light which passed through the lens 1 is separated by the half mirror 16 to the signal which goes to the CCD 14 for the chrominance signals and the signal which goes to the CCD 15 for the luminance signal and are formed as images on those CCDs, respectively. R, G, and B signals are generated from the CCD 14 and are transmitted through the S/H AGC circuit 5 and, after that, they are level adjusted by the white balance adjusting circuit 6.

The RGB signals generated from the WB adjusting circuit 6 are gamma corrected by the gamma converting circuit 8 and, after that, they are input to a matrix circuit 29. The matrix circuit 29 forms color difference signals from the input RGB signals and outputs.

The luminance signal Y is generated from the CCD 15 and is separated into the luminance signal YH of the high frequency component and the luminance signal YL of the low frequency component by the high frequency and low frequency separating circuit 23. The luminance signal YL of the low frequency component is gamma corrected by the gamma converting circuit 8 and, after that, it is input to the adder 17. The luminance signal YH of the high frequency component, on the other hand, is amplitude controlled by the gain control circuit 18 and, after that, it is input to the adder 17.

The adder 17 adds the high frequency component YH and the low frequency component YL of the luminance signal and generates the luminance signal (Y+S). The color difference signals (R–Y) and (B–Y) generated from the matrix circuit 9 and the luminance signal (Y+S) generated from the adder 17 are band limited by the low pass filters 10, 11, and 12, respectively, and are subsequently converted into a composite video signal and output.

Figure 2:
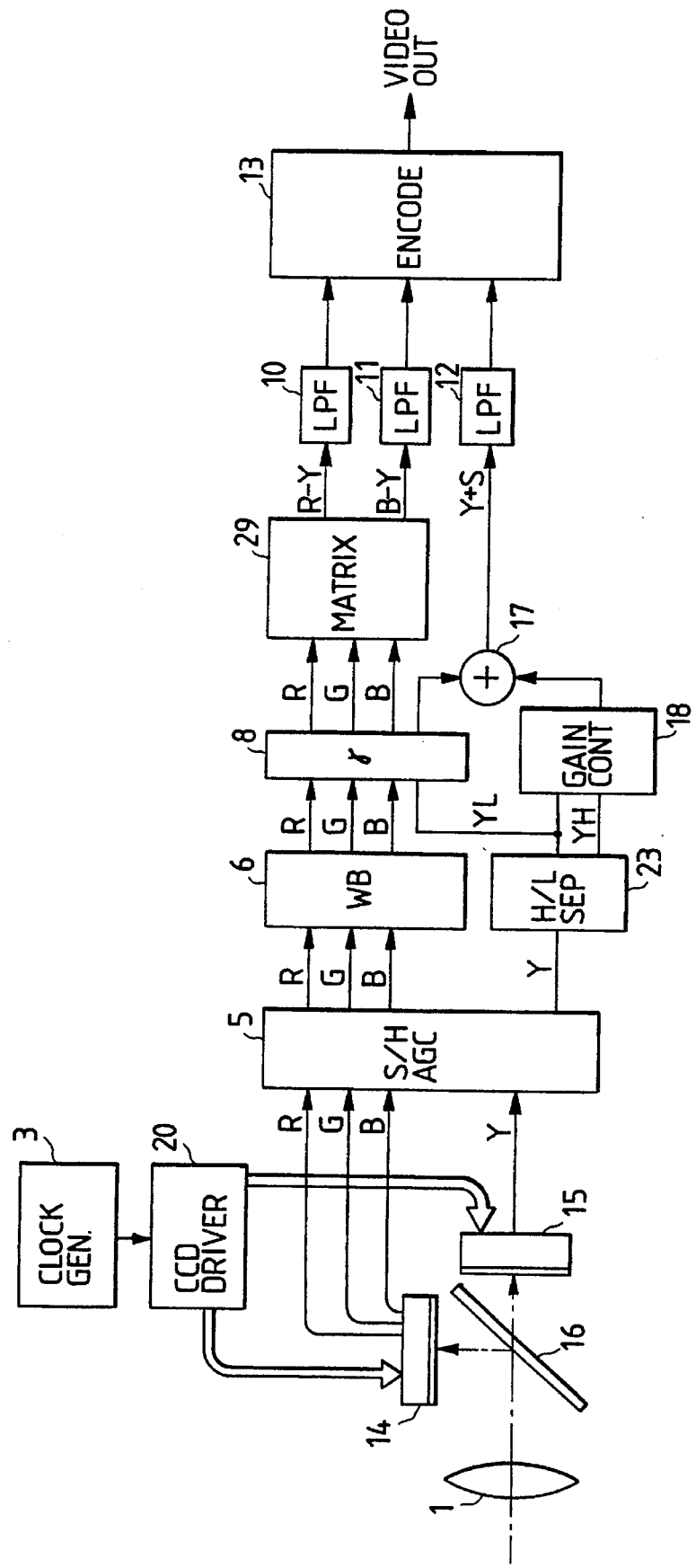
FIG. 2 is a functional block diagram showing another embodiment of an image pickup apparatus according to the invention.
Figure 3:
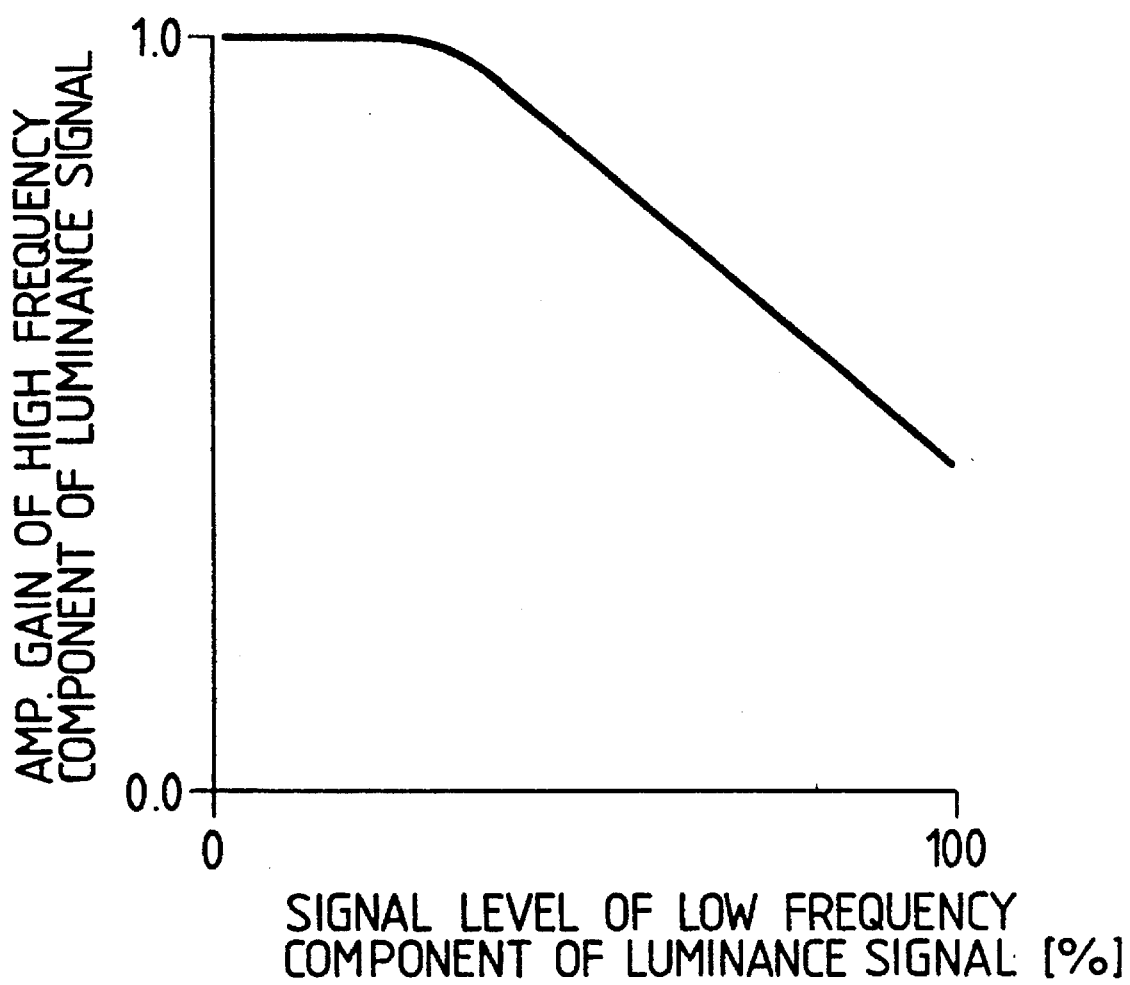
FIG. 3 is a graph showing the relation between the signal level of a low frequency component of a luminance signal and the amplification gain of a high frequency component of the luminance signal in the embodiment.
Figure 4:
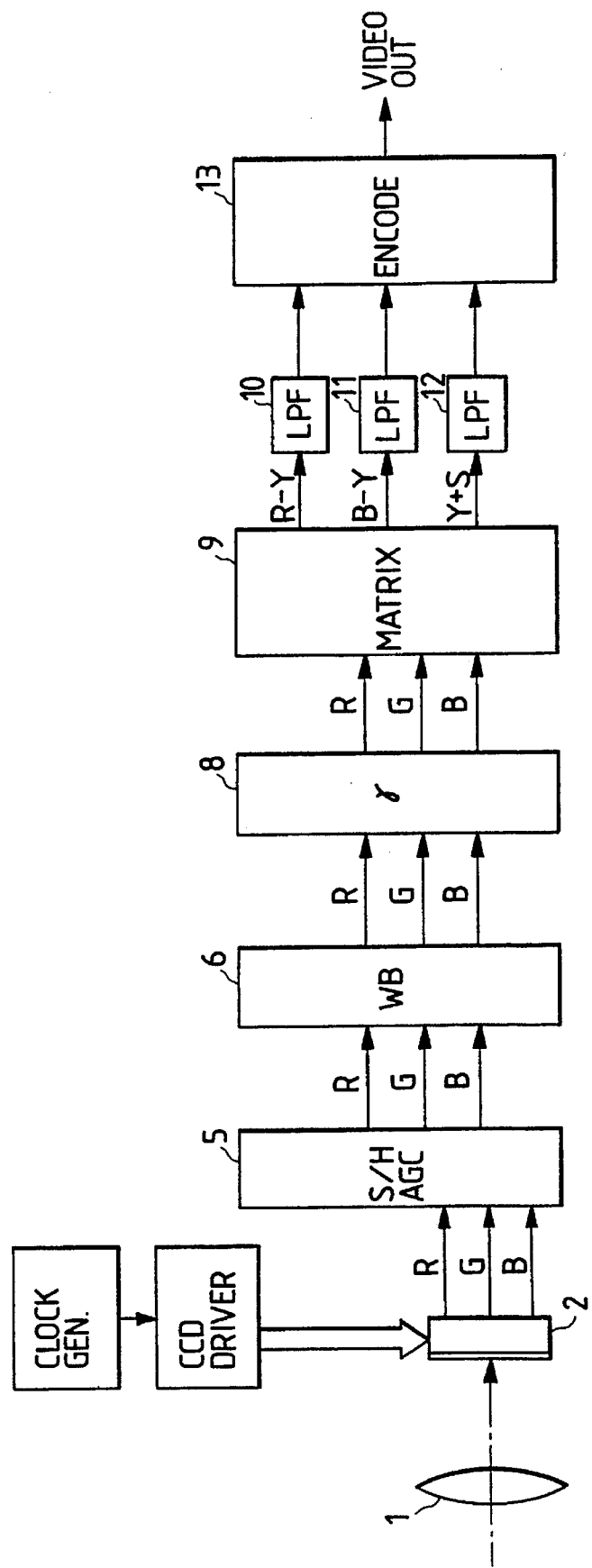
FIG. 4 is a functional block diagram of an image pickup apparatus in the conventional technique.

FIG. 3 shows the relation between the signal level of the low frequency component of the luminance signal and the amplification gain of the high frequency component of the luminance signal which is applied to the embodiments shown in FIGS. 1 and 2. As shown in FIG. 3, a gain of the amplitude control circuit (for example, amplitude control circuit 18 in FIG. 2) of the high frequency component of the luminance signal is equal to 1.0 in a (dark) portion in which the signal level of the low frequency component of the luminance signal is low. As the brightness rises, the gain gradually decreases.

By controlling the amplitude of the luminance signal as mentioned above, since the gamma correction is not executed to the high frequency component, the problem such that the high frequency component is excessively emphasized in the bright portion of the luminance signal and the S/N ratio is deteriorated can be solved.

The embodiment described in detail above can be also substantially similarly applied to the case where the output signal of the image pickup device is A/D converted and processed as a digital signal.

Another embodiment of the invention will now be described.

Figure 5:
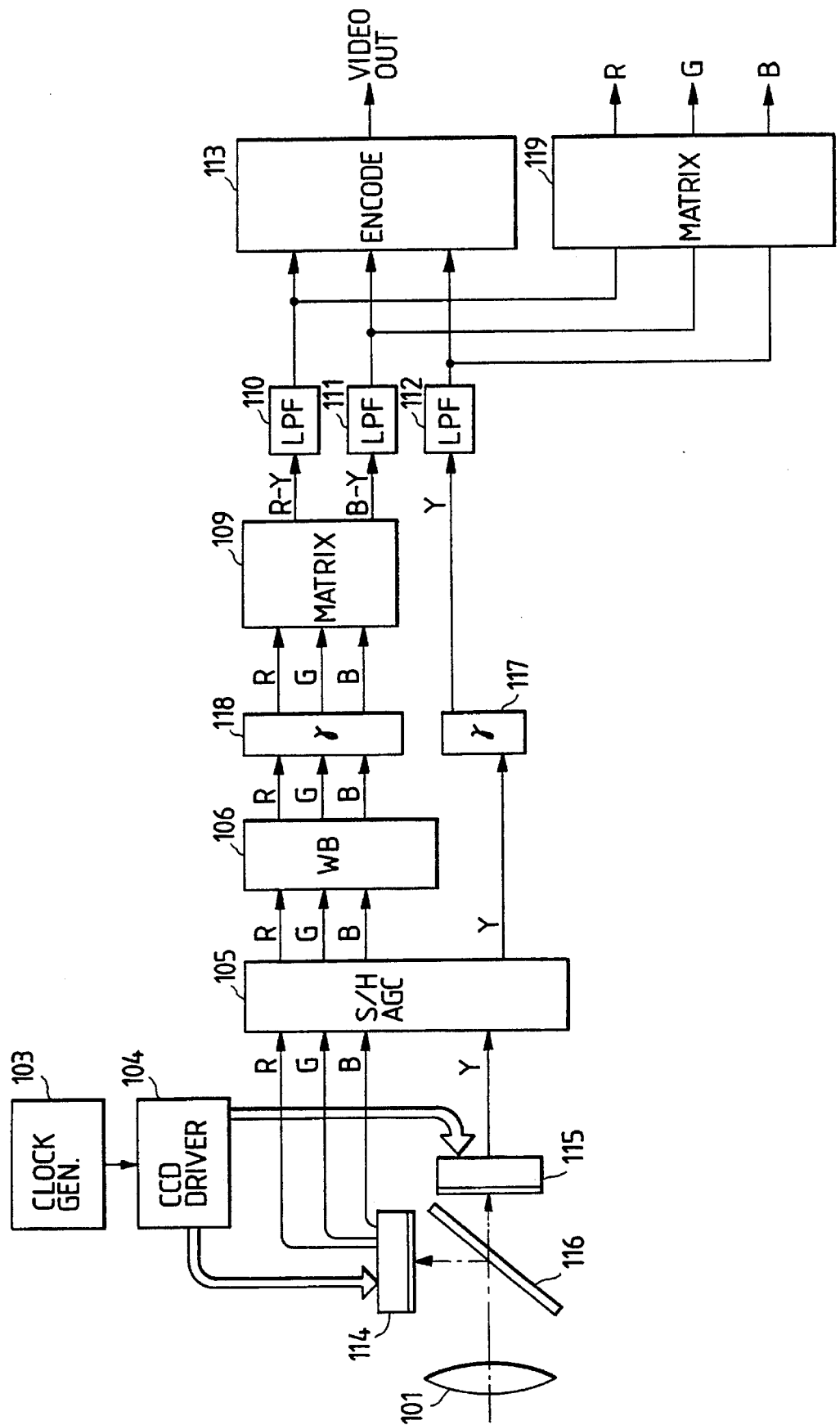
FIG. 5 is a block diagram showing the first embodiment according to one aspect of the invention.
Figure 7:
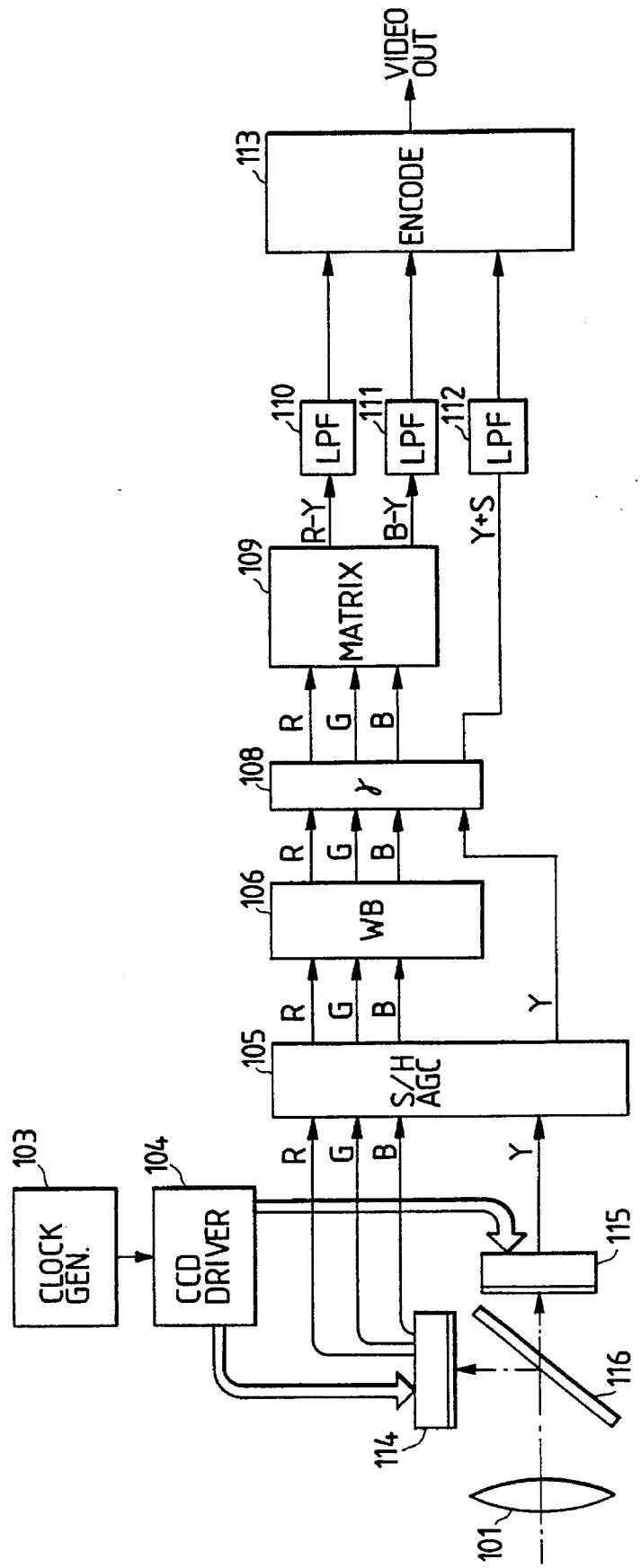
FIG. 7 is a block diagram showing a construction of a conventional double-plate type image pickup apparatus.

FIG. 5 is a block diagram showing another embodiment of the invention. In FIG. 5, reference numeral 117 denotes a gamma converting circuit for the luminance signal and 118 indicates a gamma converting circuit for the chrominance signals. In a manner similar to the conventional apparatus shown in FIG. 7, the RGB signals supplied from the white balance adjusting circuit 106 are input to the gamma converting circuit 118 for the chrominance signals. On the other hand, the luminance signal which passed through the S/H AGC circuit 105 is input to the gamma converting circuit 117 for the luminance signal. In a manner similar to the ordinary video camera, the gamma converting circuit 117 for the luminance signal executes a gamma correction of about 0.45. On the other hand, the gamma converting circuit 118 for the chrominance signals performs a gamma correction of about 0.6 to 0.7. The RGB signals generated from the gamma converting circuit 118 are converted into the color difference signals by the matrix circuit 109 and are band limited by the low pass filters 110 and 111 and, after that, they are input to the encoder 113 and a matrix circuit 119.

The luminance signal generated from the gamma converting circuit 117 is band limited by the low pass filter 112 and, after that, it is input to the encoder 113 and matrix circuit 119. The encoder 113 converts the color difference signals and the luminance signal which were input into a composite video signal and outputs. The matrix circuit 119 converts the color difference signals and the luminance signal which were input into the RGB signals and outputs.

Figure 6:
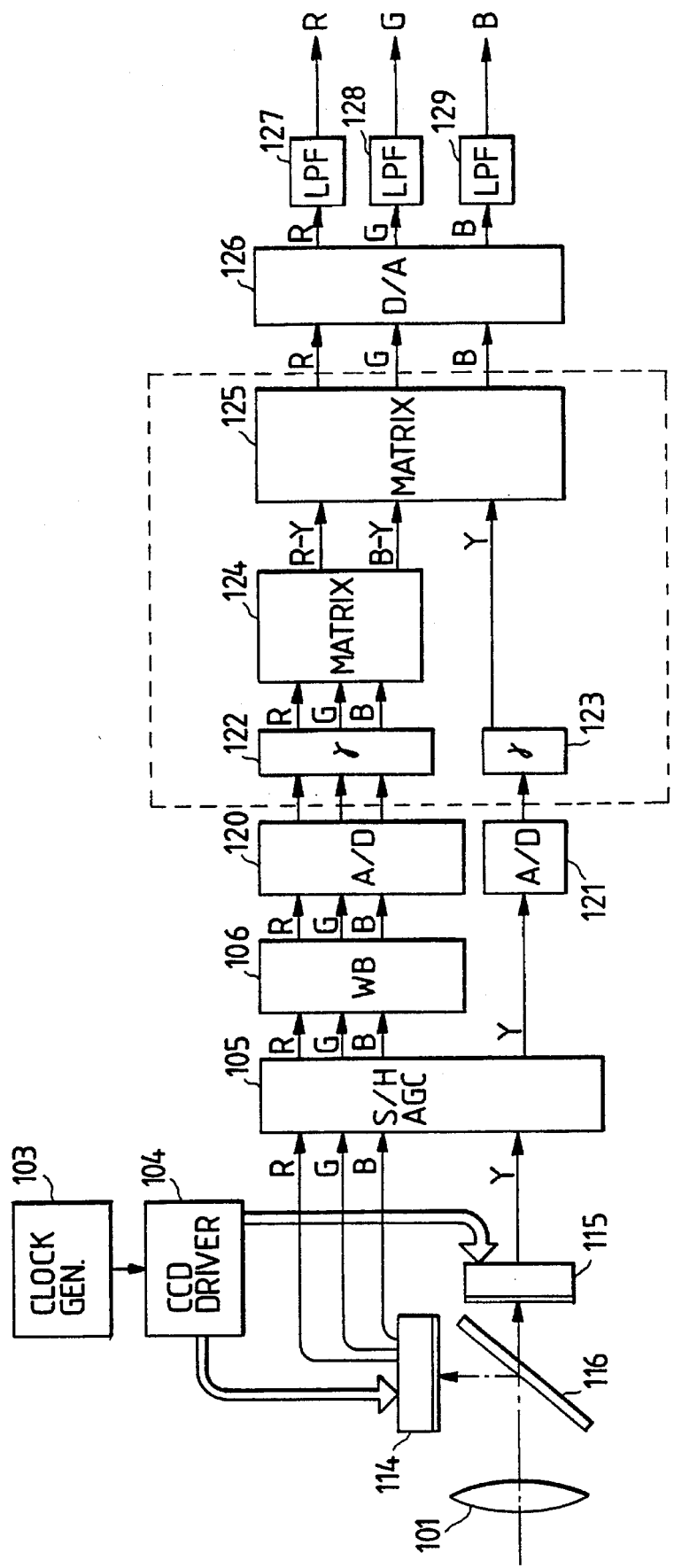
FIG. 6 is a block diagram showing the second embodiment according to one aspect of the invention.

FIG. 6 is a block diagram showing an embodiment of the invention. In FIG. 6, the processes until the S/H AGC circuit 105 and WB adjusting circuit 106 are similar to those in the first embodiment mentioned above. In the embodiment of FIG. 6, the RGB signals which are output from the WB adjusting circuit 106 are converted into the digital signals by an A/D converting circuit 120. The luminance signal which is generated from the S/H AGC circuit 105 is converted into the digital signal by an A/D converting circuit 121. A portion surrounded by a broken line in FIGS. 6 shows a range of the digital process. Reference numerals 122, 123, 124, and 125 denote blocks for digitally executing the processes corresponding to the circuits 118, 117, 109, and 119 in FIG. 5, respectively.

Reference numeral 122 denotes the block for performing the gamma correction to the RGB signals. Gamma characteristics are set to, for instance, about 0.6 to 0.7. Reference numeral 123 denotes the block to execute the gamma correction to the luminance signal and the gamma characteristics are set to, for example, about 0.45. Reference numeral 124 denotes the block for the matrix process for producing the color difference signals from the RGB signals. In the block 125, the RGB signals are again produced from the color difference signals of the outputs of the block 124 and the luminance signal of the output of the block 123 and supplies to a D/A converter 126. The RGB outputs from the D/A converter 126 pass through low pass filters 127, 128, and 129, so that analog RGB signals are output. In the embodiment, since the gamma characteristics of the block 122 are set to gentle characteristics as compared with those of the block 123, so that the number of bits of the A/D converter 120 can be set to a value smaller than the number of bits of the A/D converter 121. (For example, in the case where the number of bits of the A/D converter 121 is set to ten, the number of bits of the A/D converter 122 is set to eight). Thus, the whole circuit scale can be reduced and the costs can be decreased.

Another aspect of the invention will now be described.

Figure 8:
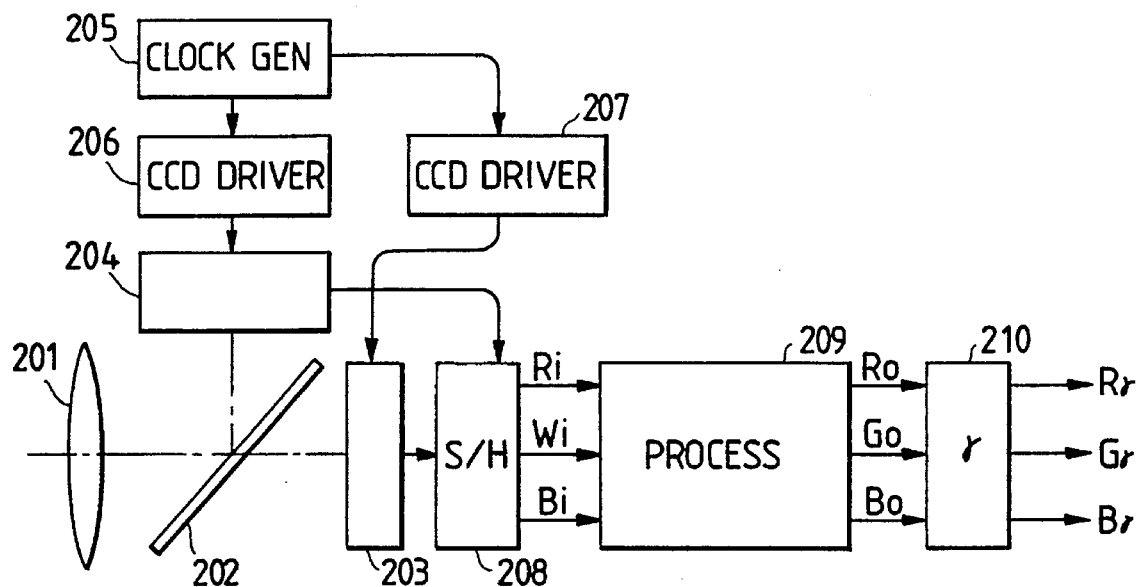
FIG. 8 is a block diagram showing the first embodiment according to another aspect of the invention.
Figure 9:
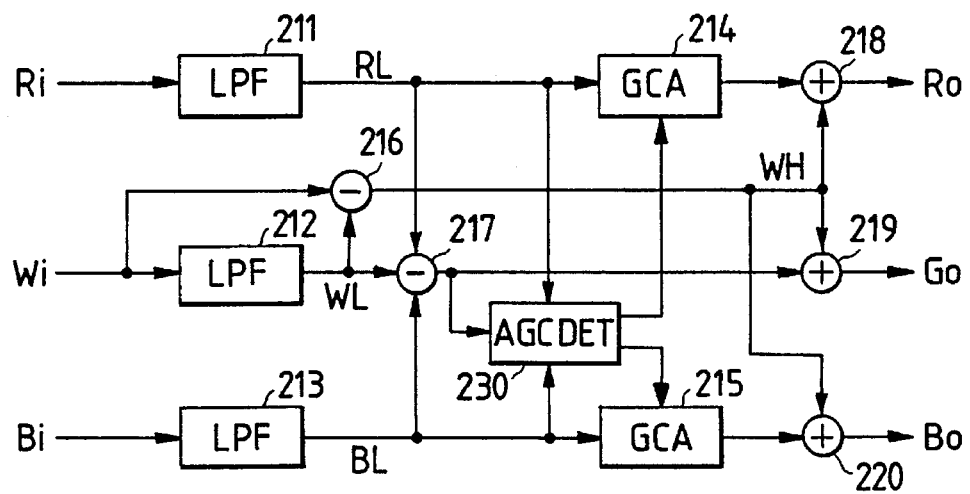
FIG. 9 is a block diagram showing the details of a processing circuit in FIG. 8.

FIGS. 8 and 9 are block diagrams showing the first embodiment in another aspect of the invention. In FIG. 8, the video image which passed through an image pickup lens 201 is transmitted through a half mirror 202 and is formed onto a CCD 203 for the luminance signal and is also reflected by the half mirror 202 and is formed onto a CCD 204 for the chrominance signals. A white signal is output from the CCD 203 for the luminance signal and passes through a sample and hold (S/H) circuit 208 and is input to a processing circuit 209.

Color filters of R and B are adhered like stripes to the CCD 204 for the chrominance signals. R and B signals are alternately output from the CCD 204 every pixel and are separated into the R and B signals by the S/H circuit 208 and are input to the processing circuit 209. A white balance is obtained by the processing circuit 209 and those signals are converted into the RGB signals. The RGB signals are gamma corrected by a gamma converting circuit 210 and output as RGB signals.

FIG. 9 shows a construction in the processing circuit 209. In FIG. 9, low frequency components RL, WL, and BL are separated from the R signal (Ri), W signal (Wi), and B signal (Bi) which were input in FIG. 9 by low pass filters 211, 212, and 213. Subsequently, the low frequency components RL and BL are subtracted from the low frequency component WL at a predetermined ratio by a subtracter 217, thereby obtaining a G signal. The G signal and the low frequency components RL and BL are input to an amplitude detecting circuit 230. The amplitudes of RL and BL are respectively adjusted by gain control amplifiers 214 and 215 so as to equalize the amplitudes of the RGB signals by a control signal which is output from the amplitude detecting circuit 230.

On the other hand, the high frequency component WH of the W signal is separated by subtracting WL from the Wi signal. By adding the high frequency component WH to each of the RGB signals by adders 218, 219, and 220, the R signal (Ro), G signal (Go), and B signal (Bo) whose frequency characteristics were corrected are obtained. According to the embodiment, the signals having the same frequency characteristics can be obtained as R, G, and B signals, so that a white balance adjusting circuit suitable for a system such as to execute signal processes by the RGB signals can be constructed.

Figure 10:
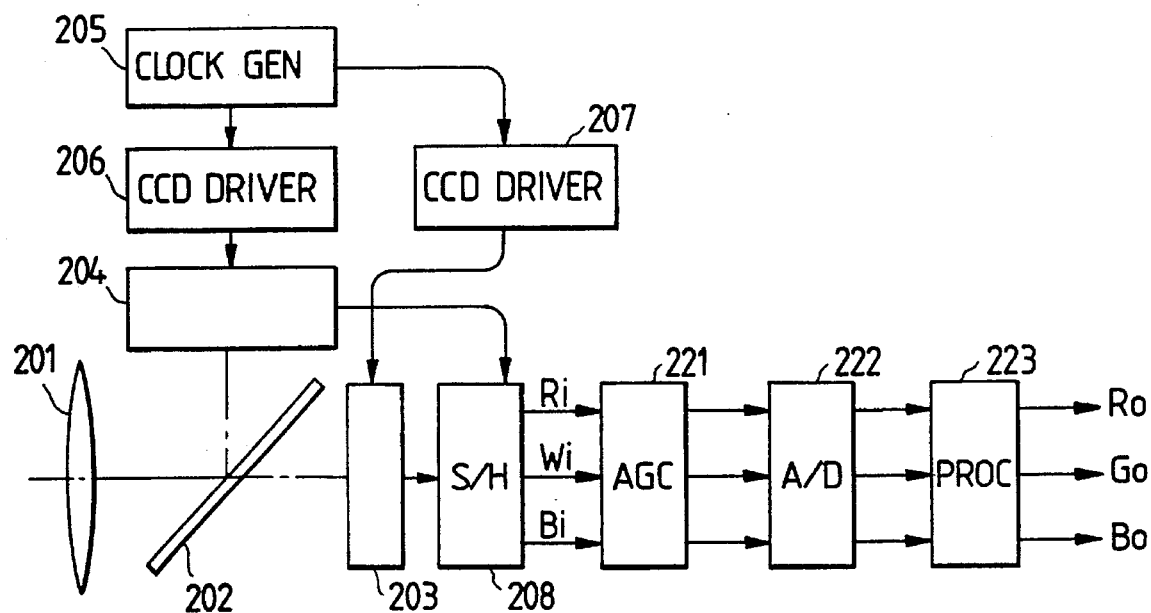
FIG. 10 is a block diagram showing the second embodiment according to another aspect of the invention.

FIG. 10 is a block diagram showing the second embodiment according to another aspect of the invention.

In FIG. 10, the processes until the signals are output from the S/H circuit 208 are similar to those in the first embodiment. In the second embodiment, however, the outputs of the S/H circuit 208 are input to an AGC circuit 221. In the AGC circuit 221, Ri, Wi, and Bi are respectively independently gain controlled and are adjusted so as to obtain the input level which is optimum to an A/D converter 222 of three channels.

After the signals were converted into the digital signals by the A/D converter 222, processes similar to those shown in FIG. 9 are executed by digital processes. According to the embodiment, since the data is digitized, not only the invention is suitable for the case of digitally recording the image but also the input signal level of the A/D converter can be optimized every channel.

Figure 11:
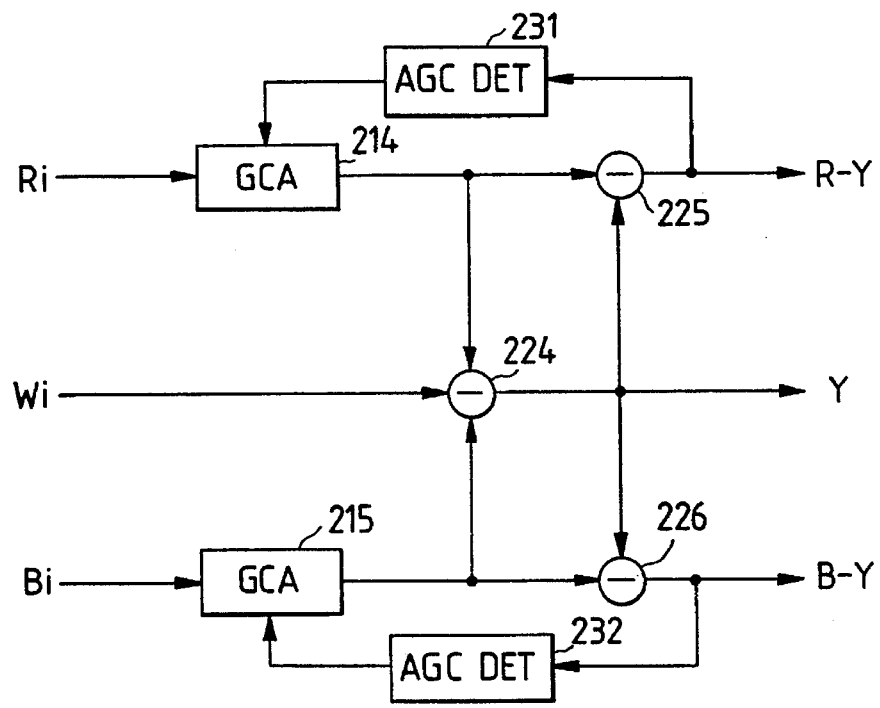
FIG. 11 is a block diagram showing the third embodiment according to another aspect of the invention.

FIG. 11 is a block diagram showing the third embodiment.

In a subtracting circuit 224, the R and B signals which are output from the gain control amplifiers 214 and 215 are subtracted from the Wi signal, thereby obtaining-the luminance signal (Y). Further, by subtracting the resultant Y signal from the R signal by a subtracting circuit 225, the color difference signal (R–Y) is obtained. By subtracting the Y signal from the B signal by a subtracting circuit 226, the color difference signal (B–Y) is obtained. The amplitude of the (R–Y) signal which is output from the gain control amplifier 214 and subtracting circuit 225 is detected by a detecting circuit 231 and is controlled so as to set the amplitude to zero.

Similarly, the gain control amplifier 215 detects the amplitude of the (B–Y) signal which is output from the subtracting circuit 226 by a detecting circuit 232 and controls so as to set the amplitude to zero.

According to the embodiment, an optimum white balance control can be performed in a system such that the signal is handled in a form of the luminance signal and color difference signal.

According to the above embodiments, the S/N ratio of the dark portion of the output image of the video camera can be remarkably improved, so that the image signal of a more natural object can be output as a video signal.

According to the embodiments, in the double-plate type image pickup apparatus of the Y-RGB system, the S/N ratio of the luminance signal can be improved. Further, according to another aspect of the invention, since the luminance signal is extracted from the image pickup device for the luminance signal and the R and B signals are extracted from the image pickup device for the chrominance signals, the sampling frequency of the chrominance signals can be set to a relatively high value, so that an influence by the color moire can be reduced. Since the luminance signal uses only the output of the image pickup device for the luminance signal, a relative positional precision between the two image pickup devices can be set to a relatively gentle value.

What is claimed is:

1. An image pickup apparatus comprising:
   (a) image pickup means for converting an image of an object into an electric signal;
   (b) high frequency and low frequency separating means for separating the electric signal output from said image pickup means into a high frequency component and a low frequency component;
   (c) non-linear converting means for non-linearly converting the electric signal of the low frequency component separated by said high frequency and low frequency separating means;
   (d) amplitude control means for reducing an amplitude of the high frequency component when a signal level of said separated low frequency component becomes larger; and
   (e) adding means for adding the electric signal of the high frequency component which amplitude controlled by said amplitude control means and the electric signal of the low frequency component which was non-linearly converted by said non-linear converting means, thereby outputting a luminance signal and color difference signals.

2. An apparatus according to claim 1, wherein said non-linear converting means executes gamma correction.

3. An image pickup apparatus comprising:
   (a) first image pickup means for outputting chrominance signals of an image of an object;
   (b) second image pickup means for outputting a luminance signal of the image of the object formed through the lens;
   (c) separating means for receiving the luminance signal from said second image pickup means and separating into the luminance signal of a high frequency component and the luminance signal of a low frequency component;
   (d) non-linear converting means for respectively receiving the chrominance signals from said first image pickup means and the luminance signal of the low frequency component from said separating means and non-linearly converting said signals;
   (e) amplitude control means for receiving the luminance signal of the high frequency component from said separating means and reducing an amplitude of said luminance signal when a signal level of the separated low frequency component becomes larger; and
   (f) adding means for adding the luminance signal from said non-linear converting means and the luminance signal form said amplitude control means.

4. An apparatus according to claim 3, wherein said non-linear converting means executes gamma correction.

5. An image pickup apparatus comprising:
   (a) first image pickup means for outputting chrominance signals of an image of an object;
   (b) second image pickup means for outputting a luminance signal of the image of the object;
   (c) high frequency and low frequency separating means for separating the luminance signal output from said second image pickup means into a high frequency component and a low frequency component;
   (d) non-linear converting means for respectively receiving the chrominance signals from said first image pickup means and the luminance signal of the low frequency component from said separating means and non-linearly converting said signals;
   (e) amplitude control means for receiving the luminance signal of the high frequency component from said separating means and performing an amplitude control of said luminance signal in accordance with a signal level of the separated low frequency component; and
   (f) adding means for adding the luminance signals from said non-linear converting means and the luminance signal from said amplitude control means.

6. An apparatus according to claim 5, wherein said non-linear converting means executes gamma correction.

7. An image pickup apparatus comprising:
   (a) first image pickup means for outputting chrominance signal of an image of an object;
   (b) second image pickup means for outputting a luminance signal of the image of the object;
   (c) first A/D converting means for converting said luminance signal into a digital luminance signal having a first number of bits;
   (d) second A/D converting means for converting said chrominance signals into digital chrominance signals having a second number of bits different than said first number of bits;
   e) first gamma converting means for executing a gamma correction to said digital luminance signal; and
   f) second gamma converting means for executing a gamma correction to said digital chrominance signals,
   wherein a gamma characteristic of the first gamma converting means is a gentle characteristic as compared with a gamma characteristic of the second gamma converting means.

8. An image pickup apparatus comprising:
(a) first image pickup means for outputting chrominance signals of an image of an object;
(b) second image pickup means for outputting a luminance signal of an image of an object;
(c) high frequency and low frequency separating means for separating the luminance signal output from said second image pickup means into a high frequency component and a low frequency component;
(d) first non-linear converting means for executing a non-linear conversion to said chrominance signals;
(e) second non-linear converting means for executing a non-linear conversion to said luminance signal, wherein characteristics of both of said first and second non-linear converting means are made different;
(f) amplitude control means for receiving the luminance signals of the high frequency component from said separating means and reducing an amplitude component from said luminance signal when a signal level of the separated low frequency component becomes larger; and
(g) adding means for adding the luminance signal from said non-linear converting means and the luminance signal from said amplitude control means.

9. An apparatus according to claim 8, wherein said non-linear converting means executes gamma correction.

10. An apparatus according to claim 8, wherein the characteristic of the second non-linear converting means is a gentle characteristic as compared with the gamma characteristic of the first non-linear converting means.

* * * * *